June 1, 1965  G. R. MACHLAN ETAL  3,187,076
APPARATUS FOR PRODUCING FINE FIBERS
Filed June 7, 1962

INVENTORS
GEORGE R. MACHLAN,
CHARLES L. McKINNIS &
BY HELLMUT I. GLASER

ATTORNEYS 3,187,076
APPARATUS FOR PRODUCING FINE FIBERS
George R. Machlan, Newark, and Charles L. McKinnis, Granville, Ohio, and Hellmut I. Glaser, Anderson, S.C., assignors to Owens-Corning Fiberglas Corporation, Toledo, Ohio, a corporation of Delaware
Filed June 7, 1962, Ser. No. 200,854
14 Claims. (Cl. 13—6)

This invention relates to the production of fibers from thermoplastic materials and more particularly to a feeder for conditioning the thermoplastic material for the production of these fibers.

Although this invention will be described with particular reference to the production of fibers from glass, the principles of this invention are equally applicable to the production of fibers from other organic and inorganic materials wherein they are formed by attenuation from a molten supply source.

One often used process for the production of glass fibers utilizes preformed, cold, marbles of glass which are supplied to a feeder and melted therein. These marbles are produced by supplying the raw glass forming batch materials to one end of a large glass tank. The raw materials are progressively moved through the glass tank while being melted and combined to form a homogeneous pool of molten glass at the opposite end of the glass tank. Molten glass flows from this homogeneous pool as a rather large stream. This stream is cut into short lengths which are fed to a marble forming machine which rolls the cut lengths of hot glass into an annular shape and cools them.

These marbles of refined glass are supplied to a suitable feeder having many orifices in the bottom and are melted therein. The molten glass flows through the orifices in the bottom of the feeder as a plurality of tiny streams which are attenuated to form fine filaments. These fine filaments are coated with a suitable protective sizing material and combined into a flexible strand which is collected on the attenuating collet.

The remelting of the marbles of glass in this feeder is a rather complex operation. In order to have a continuous operation, free from interruptions, these marbles must be rapidly and completely melted and conditioned and the glass from all of the marbles recombined to form a homogeneous, free flowing glass that is free from seeds, stones, and other impurities common to the glass making trades. This conditioning of the glass into a homogeneous mass, free from impurities, is especially important when producing glass fibers because the orifices in the bottom of the feeder, through which the melted glass flows are very small and are easily plugged by impurities in the glass and even viscous cords of glass that may be invisible to the naked eye. These irregularities in the glass are eliminated by "cooking" it for a sufficient length of time that the fluxes in the glass will react with the impurities and break them down to form a homogeneous mass of molten glass. The length of time the glass must be "cooked" depends upon the temperature at which it is being "cooked" as the action of these fluxes progresses much more rapidly at high temperatures. In order to promote this rapid dissolving of the impurities, the melting marbles in the top of the feeder are heated to a temperature several hundred degrees higher than the temperature at which the glass fibers are formed. The glass is then cooled in the lower part of the feeder to the desired temperature for forming the glass fibers.

The feeders in which the marbles are melted are generally constructed from an expensive platinum alloy and in order to provide the most economical process it is necessary to keep the size of the feeder small so that the minimum amount of metal is used. Further, it is desirable to flow as much glass as possible through each feeder to keep the number of feeders used to a minimum.

In order to maintain this high rate of flow of the glass through these small feeders it is necessary to supply heat from the feeder to the melting glass at a very high rate. The feeders are generally heated by passing large quantities of electrical current through their walls from a suitable electrical supply source. This current heats the walls of the feeder to a temperature generally higher than the melting glass and most of this heat is transferred to the glass from the side walls of the feeder. The glass near the walls of the feeder is heated to a large extent by radiation directly from the side walls of the feeder. This heat must be in turn re-radiated or transferred by solid conduction to the remainder of the glass. It has been found that improved feeders for forming glass fibers can be constructed by tailoring the feeder to more effectively heat the melting glass by radiation directly from the side walls of the feeder.

At the high temperatures at which the feeders of this invention are operated, a majority of the heat which is used to heat the glass is radiated directly from the heated sections of the feeder as infra-red radiation. Thus the feeders of this invention are constructed so that the glass in all sections of the feeder are heated by infra-red radiation directly from the feeder side walls.

The average distance the radiations from the side walls will travel through the melting glass is determined by measuring the attenuation of radiation of the desired wave length from a controlled source through a measured thickness of glass and from this determining the absorption coefficient of the glass by using the relationship.

$$I = (1-R)^2 I_0 e^{-aT}$$

where $I_0$ is the intensity of the source of radiation,
$I$ is the measured intensity of the radiation after passing through the glass,
$(1-R)$ is a constant used to account for the loss of radiation at the air glass interfaces,
$e$ is the base for natural logarithms,
$T$ is the optical path length between the source and the receiver, and
$a$ is the absorption coefficient for the glass and radiations of that wave length.

Most of the heat radiated to the glass is in the form of radiations having wave lengths in the order of from one to five microns. The "maximum absorption distance" is determined by first computing the arithmetic average of the absorption coefficients for many wave lengths between one and five microns.

This average absorption coefficient is then used to compute the maximum distance radiation, directly from the side walls of the feeder, will penetrate through the glass and this distance is designated one "maximum absorption distance." Thus, glass more than one "maximum absorption distance" from a source of heat will for the most part not be heated by radiation directly from the source, but must be heated by conduction of the heat through the glass. Thus, in feeders constructed in accordance with this invention all of the glass is no more than one maximum absorption distance from a primary source of infra-red radiation so that it will be heated by radiation directly from the sidewalls of the feeder.

Thus, it is apparent that the "maximum absorption distance" varies according to the opaqueness of the glass and the temperature at which the feeder is being operated, but for the production of continuous glass fibers from commonly used glasses, such as type E, it is from ¾ inch to 1½ inches.

Further improvements in the operating characteristics of the feeder have been made by isolating the orifices in the bottom wall of the feeder from fluctuations in temperature in the upper portions of the feeder. One method of accomplishing this is by placing an opaque radiation blocking shield immediately above orifices in the bottom wall of the feeder. This radiation blocking shield is supported from the feeder side walls but is essentially electrically independent therefrom so that variations in the supply of electricity to the feeder will not affect it. This radiation blocking shield is constructed so that the sections of feeder and glass located above it cannot radiate directly down to affect the glass and orifices located below the shield. This independence of the orifices and the glass thereabove from variations in temperature in the upper areas of the feeder provides a smooth fiber forming operation relatively free from disturbances resulting from temperature changes in the upper sections of the feeder. A preferred form of this radiation blocking shield has several openings through which molten glass will flow downward into the lower section of the feeder. The openings in the radiation blocking shield are contoured so that very little of the heat radiated by the glass in the upper sections of the feeder will pass therethrough.

The preparation of the melting glass prior to its flowing through the orifices in the bottom of the feeder and attenuation into fibers is a process that varies quite widely in its requirements for heat depending upon how near to being fully melted the glass is. A large quantity of heat must be supplied to the section of the feeder wherein the cold glass marbles are melted to heat them to a temperature at which they are liquid and the fluxes therein will react to refine and homogenize it. The glass is held for a long time immediately below this primary melting section so that it will be refined and conditioned. In this section of the feeder relatively little heat is added to the glass as it is necessary only to replace the heat lost from the glass by conduction and radiation. In the third or bottom-most section of the feeder, it is necessary to remove heat from the glass to cool the glass to a temperature such that fibers can be formed therefrom.

In most prior art feeders, a single heating electrical supply unit was used to supply heat to the feeder. This invention provides an improved feeder wherein the various sections of the feeder are operated electrically independent from one another thereby allowing each section to be heated for the maximum benefit to the glass in that section.

An object of this invention is to provide an improved feeder for the formation of fibers from thermoplastic materials.

A further object of this invention is to provide a feeder for melting material for the formation of fibers wherein all of the melted material is heated by radiation directly from the feeder side walls.

Another object of this invention is to provide a feeder for producing glass fibers wherein the temperature of the feeder side walls are selectively varied to most effectively heat the glass adjacent thereto.

A further object of this invention is to provide a feeder wherein the various sections of the feeder are heated independently.

Another object of this invention is to provide a feeder having a shield therein to reduce the radiation of heat from the upper portion of the feeder to the section immediately above the orifices in the bottom of the feeder.

Further objects and advantages of this invention will become apparent from a consideration of the specification and drawings of a form of this invention, which may be preferred, in which.

Figure 1:
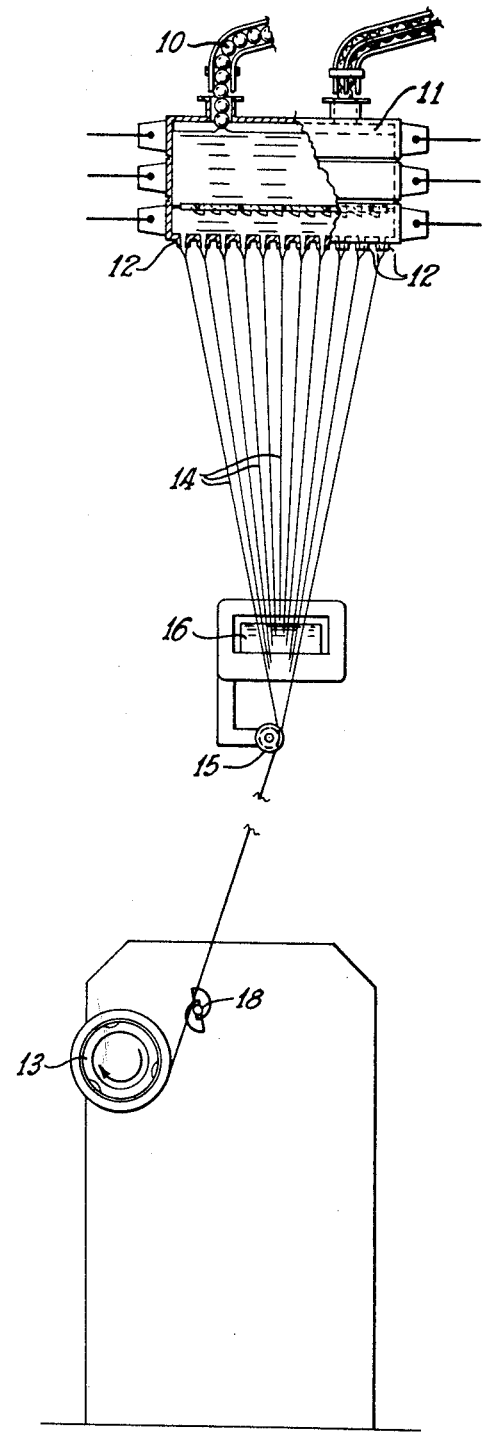
FIGURE 1 is a sectional elevation view of a process for forming glass fibers utilizing a feeder built in accordance with this invention.

Referring to FIGURE 1, cold glass marbles 10 are supplied to a feeder 11 which melts and homogenizes them. The molten glass flows as a plurality of streams through orifices 12 in the bottom of the feeder. A winding collet 13 attenuates these streams of molten glass into fine filaments 14 which solidify upon cooling and are gathered together into a multi-filament strand by the grooved gathering wheel 15. A suitable protective size is applied to the individual filaments immediately above the gathering shoe by a size applicator such as a wetted belt 16. The strand of gathered sized filaments passes downward over the gathering wheel 15 and is collected by winding it on the attenuating collet 13. A suitable traversing mechanism 18 is positioned immediately above the attenuating collet. The strands are engaged by this traverse and moved back and forth across the attenuating and collecting collet to form a package having a desirable predetermined orientation of the strand.

Figure 2:
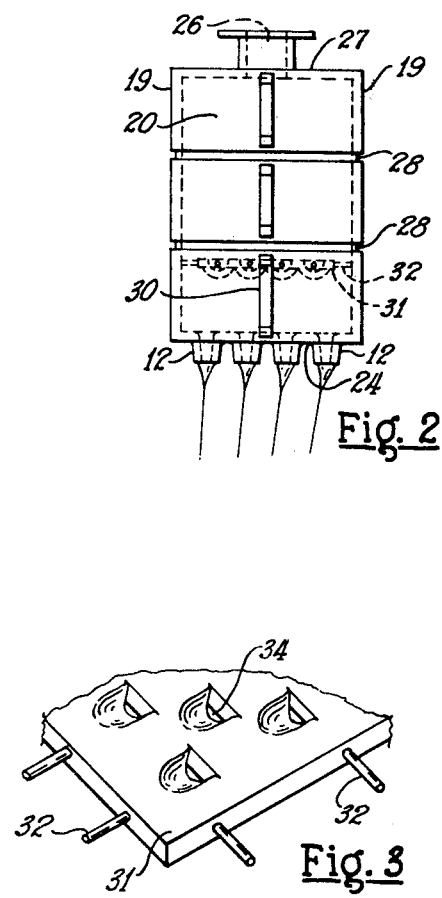
FIGURE 2 is a sectional view on an enlarged scale of the feeder of FIGURE 1.

FIGURE 2 illustrates in greater detail a preferred form of a feeder 11 built in accordance with this invention for supplying molten glass to be attenuated into fine filaments. It is a generally rectangular shaped container having side walls 19 and end walls 20. The cold marbles flow into the feeder through openings 26 in the top wall 27 and the molten glass flows out as a plurality of streams through orifices 12 in the bottom wall 24 of the feeder. This invention provides a means for more precisely controlling the amount of heat supplied to the glass at a particular level in the feeder by dividing the feeder into several electrically independent levels. This division of the feeder is accomplished by thinning out horizontal bands in the side walls of the feeder. These bands extend completely around the feeder. The electrical resistance of these thin bands is much higher than that of the thicker sections of the feeder so that only a minor amount of current flows from one section to another therethrough. The feeder of FIGURE 2 is divided into three separate horizontal sections by the two thin bands 28 which are built into the feeder during its fabrication such as by cutting away part of the thickness of the alloy sheet that is used to make the feeder side walls. Each of these separate horizontal sections of the feeder has its own set of electrical terminals 30 which are connected to an independent power supply.

A suitable temperature sensing mechanism is incorporated into each section of the feeder to regulate the power supply and control the temperature in that section of the feeder. Further, each section of the feeder is operated at the temperature at which it will most effectively act upon the glass within that section. For example, the feeder illustrated can be operated with the top section very hot to function as a primary melting section, the middle section somewhat cooler to function as a homogenizing or conditioning area, with the bottom section functioning as a reservoir of homogenized glass ready to be attenuated into fibers. The bottom section can be operated somewhat cooler than the glass to remove heat therefrom to cool it to the preferred attenuating temperature.

As a further aid to independent control of the glass immediately above the fiber forming orifices, an unheated radiation blocking shield 31 extending almost completely across the feeder is provided to prevent the hot glass and the sections of the feeder thereabove from radiating downward into this section and adversely affecting the glass therein. This radiation blocking shield is supported from the sidewalls of the feeder by rather thin wires 32 welded thereto. Because the electrical resistance of these wires is far greater than the resistance of the feeder sidewalls, very little electricity flows through them and the heating of the shield thereby may be neglected. The radiation blocking shield is mounted slightly away from the feeder sidewalls so that glass can flow downwardly past it adjacent the feeder sidewalls.

The multiple level construction of feeders constructed in accordance with this invention is especially important when it is desired to use the same feeder for producing fibers from several types of glass each having slightly different melting characteristics. By regulating the power supplied to each section ideal melting characteristics for the particular glass being melted can be approximated. This is especially important if, in order to fiberize a particular glass, it is necessary to operate the center of the feeder at a temperature somewhat higher than either the top or bottom.

Figure 3:
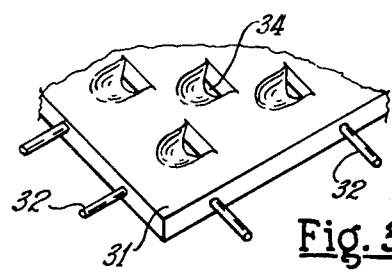
FIGURE 3 is an enlarged view of a radiation blocking shield used in feeders of this invention.

As illustrated in FIGURE 3, the radiation blocking shield 31 is constructed of an opaque, high temperature material such as the platinum alloy used in the construction of the rest of the feeder. The thin supporting wires 32 are welded to the feeder sidewalls when installing the shield. Openings 34 distributed across the shield provide for the flowing of glass downward through it into the lowermost section of the feeder. These openings in the radiation blocking shield are carefully designed so that they can be produced by deforming the shield without providing vertical openings therein. When so constructed, molten glass from above the shield can flow freely downward through these openings and most of the radiation from the hot materials thereabove is intercepted and prevented from reaching the bottom section of the feeder. This shield thereby effectively isolates the lower section of the feeder from many of the fluctuations in temperature that occur in the upper section and thereby aids in maintaining all of the glass in this section at a uniform temperature.

Figure 4:
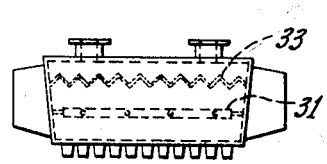
FIGURE 4 is an elevation view of a feeder with a single electrical supply source incorporating the radiation blocking shield of this invention.

FIGURE 4 illustrates the use of a radiation blocking shield 31 in a feeder 33 that is heated by but one power supply. Here the radiation blocking shield is installed just above the outlet orifices in the bottom wall of the feeder to isolate the glass in the bottom of the feeder and the bottom wall from radiation from the remainder of the feeder. The radiation blocking shield installed in this type of feeder will shield the molten glass in the lower part of the feeder from fluctuations in temperature in the upper section of the feeder. Cold marbles are usually supplied to the feeder intermittently. This places a correspondingly changing load on the melting section of the feeder. Without the radiation blocking shield of this invention these variations in the load placed on the top section feeder and in the temperature of the glass in the top section of the feeder are reflected in variations in the temperature and viscosity of the glass in the lower section of the feeder and degrade the fiber forming operation.

Many feeders incorporate a heated metal screen 33 in the upper part of the melting zone to aid in supplying heat to the melting glass. The corrugated screen 33 is electrically connected to the feeder sidewalls so that it is heated by current passing therethrough. The cold marbles coming into the feeder contact this screen and are heated directly therefrom. This improved heating screen is corrugated to provide a rather large surface area for passing heat to the melting glass. However, the corrugations are intentionally rather small so that all of the screen is approximately the same distance from the bottom wall of the feeder. When the melting screen is constructed in this manner, increased melting area will be provided and all areas of the screen will be about the same distance from the bottom wall of the feeder and will therefore affect it equally whereas portions of many prior art heating screens were positioned quite near the bottom wall of the feeder and would influence some portions of the bottom wall to a greater extent than it would other portions. It has been found that if the corrugations have a height of no more than about one inch, all areas of the bottom wall will be affected substantially uniformly.

It is apparent that within the scope of this invention, modifications and different arrangements may be made other than are herein disclosed, such as by changing the number of independent sections in the feeder, and the present disclosure is illustrative merely, the invention comprehending all variations thereof.

We claim:

1. A feeder for delivering molten glass in streams to be drawn into fiber form, said feeder comprising
    (1) an electrically heated vessel having connected upstanding side and end walls, a bottom wall having at least one fiber forming orifice therein and electrical connection means, said vessel being adapted to conduct electricity and emit infra-red radiation substantially in the range of 1 to 5 microns,
        (a) two of said walls being opposed and spaced apart a distance equal to about twice the "maximum absorption distance" under exposure to infra red radiation substantially in the range of about 1 to 5 microns issuing from said walls whereby substantially all the material in said vessel will be directly heated by infra red radiation,
        (b) said side and end walls possessing at least one peripheral area of reduced wall thickness to thereby define, in an otherwise integral vessel, at least two vertically spaced substantially electrically-independent sections,
    (2) an electric heater strip for heating material connecting two of said opposed walls, said strip being of corrugated configuration, and
    (3) a plate member substantially spanning said vessel and located above said orifice, said plate member having major upper and lower surfaces and containing a plurality of passageways which extend through said plate in fluid conveying relationship, said passageways including a segment thereof which has a central axis extending beyond only one of said major surfaces, whereby molten glass therebeneath is essentially thermally isolated from the material in the feeder above said plate.

2. A feeder for delivering heat softenable material in fiber form, said feeder comprising
    (1) an electrically heated vessel having connected upstanding side and end walls, a bottom wall having at least one fiber forming orifice therein and electrical connection means, said vessel being adapted to conduct electricity and emit infra-red radiation substantially in the range of 1 to 5 microns,
        (a) said side and end walls possessing at least one peripheral area of reduced wall thickness to thereby define, in an otherwise integral vessel, at least two vertically spaced substantially electrically-independent sections, and
    (2) a plate member substantially spanning said vessel and located above said orifice, said plate member having major upper and lower surfaces and containing a plurality of passageways which extend through said plate in fluid conveying relationship, said passageways including a segment thereof which has a central axis extending beyond only one of said major surfaces, whereby heat softened material therebeneath is essentially thermally isolated from the material in the feeder above said plate.

3. A feeder for delivering molten glass in streams to be drawn into fiber form, said feeder comprising
    (1) an electrically heated vessel having connected upstanding side and end walls, a bottom wall having at least one fiber forming orifice therein and electrical connection means, said vessel being adapted to conduct electricity and emit infra red radiation substantially in the range of 1 to 5 microns,
        (a) two of said walls being opposed and spaced apart a distance equal to about twice the "maximum absorption distance" under exposure to infra red radiation substantially in the range of about 1 to 5 microns issuing from said walls whereby substantially all the material in said vessel will be heated by infra red radiation, (b) said side and end walls possessing at least one peripheral area of reduced wall thickness to thereby define, in an otherwise integral vessel, at least two vertically spaced substantially electrically-indepedent sections, and (2) a plate member substantially spanning said vessel and located above said orifice, said plate member having major upper and lower surfaces and containing a plurality of passageways which extend through said plate in fluid conveying relationship, said passageways including a segment thereof which has a central axis extending beyond only one of said major surfaces, whereby molten glass about to be formed into fiber is essentially thermally isolated from the material in the feeder above said plate.

4. A feeder for delivering heat softenable material in fiber form, said feeder comprising (1) an electrically heated vessel having connected upstanding side and end walls, a bottom wall having at least one fiber forming orifice therein and electrical connection means, said vessel being adapted to conduct electricity and emit infra-red radiation substantially in the range of 1 to 5 microns, (a) two of said walls being opposed and spaced apart a distance equal to about twice the "maximum absorption distance" under exposure to infra red radiation substantially in the range of about 1 to 5 microns issuing from said walls whereby substantially all the material in said vessel will be heated by infra red radiation, and (2) an electric heater strip for heating material connecting two of said opposed walls, said strip being of corrugated configuration.

5. A feeder for delivering molten glass in streams to be drawn into fiber form, said feeder comprising (1) an electrically heated vessel having connected upstanding side and end walls, a bottom wall having at least one fiber forming orifice therein and electrical connection means, said vessel being adapted to conduct electricity and emit infra-red radiation substantially in the range of 1 to 5 microns, (a) said side and end walls possessing at least one peripheral area of reduced wall thickness to thereby define, in an otherwise integral vessel, at least two vertically spaced substantially electrically-independent sections, and (2) an electric heater strip for heating material connecting two of said opposed walls, said strip being of corrugated configuration.

6. A feeder for delivering heat softenable material in fiber form, said feeder comprising (1) an electrically heated vessel having connected upstanding side and end walls, a bottom wall having at least one fiber forming orifice therein and electrical connection means, said vessel being adapted to conduct electricity and emit infra-red radiation substantially in the range of 1 to 5 microns, (a) said side and end walls possessing two generally parallel, spaced, peripheral areas of reduced wall thickness extending completely about said feeder, to thereby define, in an otherwise integral, essentially one-piece vessel, three vertically spaced sections which are substantially, electrically independent, said walls including separate electrical connection means for each section whereby said sections can be individually heated.

7. A feeder for delivering heat softenable material in fiber form, said feeder comprising (1) an electrically heated vessel having connected upstanding side and end walls, a bottom wall having at least one fiber forming orifice therein and electrical connection means, said vessel being adapted to conduct electricity and emit infra-red radiation substantially in the range of 1 to 5 microns, (a) said side and end walls possessing two, generally parallel, spaced, peripheral areas of reduced wall thickness extending completely about said feeder, to thereby define, in an otherwise integral, essentially one-piece vessel, three vertically spaced sections which are substantially, electrically independent, said walls including separate electrical connection means for each section whereby said sections can be individually heated, and (2) a plate member substantially spanning said vessel and located above said orifice, said plate member having major upper and lower surfaces and containing a plurality of passageways which extend through said plate in fluid conveying relationship, said passageways including a segment thereof which has a central axis extending beyond only one of said major surfaces, whereby heat softened material therebeneath is essentially thermally isolated from the material in the feeder above said plate.

8. A feeder for delivering molten glass in streams to be drawn into fiber form, said feeder comprising (1) an electrically heated vessel having connected upstanding side and end walls, a bottom wall having at least one fiber forming orifice therein and electrical connection means, said vessel being adapted to conduct electricity and emit infra-red radiation substantially in the range of 1 to 5 microns, (a) said side and end walls possessing at least one peripheral area of reduced wall thickness to thereby define, in an otherwise integral vessel, at least two vertically spaced substantially electrically-independent sections.

9. A feeder for delivering heat softenable material in fiber form, said feeder comprising (1) an electrically heated vessel having connected upstanding side and end walls, a bottom wall having at least one fiber forming orifice therein and electrical connection means, said vessel being adapted to conduct electricity and emit infra-red radiation substantially in the range of 1 to 5 microns, and (2) a plate member substantially spanning said vessel and located above said orifice, said plate member having major upper and lower surfaces and containing a plurality of passageways which extend through said plate in fluid conveying relationship, said passageways including a segment thereof which has a central axis extending beyond only one of said major surfaces, whereby heat softened material therebeneath is essentially thermally isolated from the material in the feeder above said plate.

10. A feeder as claimed in claim 7, wherein said plate member lies proximate and just below the lowermost of said areas.

11. A feeder for delivering molten glass in streams to be drawn into fiber form, said feeder comprising (1) an electrically heated vessel having connected upstanding side and end walls, a bottom wall having at least one fiber forming orifice therein and electrical connection means, said vessel being adapted to conduct electricity and emit infra-red radiation substantially in the range of 1 to 5 microns, (2) a generally flat planar member substantially spanning said vessel at a point above said orifice but adapted to lie well below the level of the molten glass in said vessel, said member including a plurality of depressions in the upper surface, said depressions defining a generally vertical surface normal to said upper surface, said depressions further defining an opening co-planar with said vertical surface, said opening communicating with the side of said member opposite said depressions, said opening permitting flow of molten glass therethrough but substantially blocking passage of infra red rays.

12. A feeder for delivering heat softenable material in fiber form, said feeder comprising
   (1) an electrically heated vessel having connected upstanding side and end walls, a bottom wall having at least one fiber forming orifice therein and electrical connection means, said vessel being adapted to conduct electricity and emit infra-red radiation substantially in the range of 1 to 5 microns,
      (a) said side and end walls possessing at least one peripheral area of reduced wall thickness to thereby define, in an otherwise integral vessel, at least two vertically spaced substantially electrically-independent sections, and
   (2) a generally flat planar member substantially spanning said vessel at a point above said orifice but adapted to lie well below the level of the molten material in said vessel, said member including a plurality of depressions in the upper surface, said depressions defining a generally vertical surface normal to said upper surface, said depressions further defining an opening co-planar with said vertical surface, said opening communicating fluidly with the side of said member opposite said depressions, said opening permitting flow of molten material therethrough but substantially blocking passage of infra red rays.

13. A feeder for delivering molten glass in streams to be drawn into fiber form, said feeder comprising
   (1) an electrically heated vessel having connected upstanding side and end walls, a bottom wall having at least one fiber forming outlet therein and electrical connection means, said vessel being adapted to conduct electricity and emit infra-red radiation substantially in the range of 1 to 5 microns, and
   (2) a radiation shield located generally normal to the flow of molten material passing through said feeder and dividing said feeder into two parts, the smaller of which is proximate the feeder outlet, said shield comprising an opaque member having an upper and lower surface one of said surfaces containing recesses defining openings allowing glass to pass through said member, substantially all of said openings having a central axis extending beyond only one surface of said shield, whereby infra red rays are substantially blocked from passage from said upper part into said lower part.

14. A feeder for delivering molten glass in streams to be drawn into fiber form, said feeder comprising
   (1) an electrically heated vessel having connected upstanding side and end walls, a bottom wall having at least one fiber forming outlet therein and electrical connection means, said vessel being adapted to conduct electricity and emit infra-red radiation substantially in the range of 1 to 5 microns,
      (a) said side and end walls possessing two generally parallel, spaced, peripheral areas of reduced wall thickness extending completely about said feeder, to thereby define, in an otherwise integral, essentially one-piece vessel, three vertically spaced sections which are substantially, electrically independent, said walls including separate electrical connection means for each section whereby said sections can be individually heated, and
   (2) a radiation shield located generally normal to the flow of molten glass passing through said feeder and dividing said feeder into two parts, the smaller of which is proximate the feeder outlet, said shield comprising an opaque member having an upper and lower surface one of said surfaces containing recesses defining openings allowing glass to pass through said member, substantially all of said openings having a central axis extending beyond only one surface of said shield, whereby infra red rays are substantially blocked from passage from said upper part into said lower part.

References Cited by the Examiner
UNITED STATES PATENTS

| 2,280,101 | 4/42 | Slayter et al. | 13—6 |
| 2,377,772 | 6/45 | Fletcher et al. | 13—6 |

RICHARD M. WOOD, *Primary Examiner.*

JOSEPH V. TRUHE, *Examiner.*